(12) United States Patent
Willerton

(10) Patent No.: US 7,240,951 B2
(45) Date of Patent: Jul. 10, 2007

(54) VISOR ASSEMBLY WITH INTEGRATED STORAGE RECEPTACLES

(75) Inventor: Joshua Willerton, Los Alamos, NM (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/547,853

(22) PCT Filed: Mar. 4, 2004

(86) PCT No.: PCT/US2004/006678

§ 371 (c)(1),
(2), (4) Date: Sep. 2, 2005

(87) PCT Pub. No.: WO2004/078503

PCT Pub. Date: Sep. 16, 2004

(65) Prior Publication Data

US 2006/0181106 A1    Aug. 17, 2006

Related U.S. Application Data

(60) Provisional application No. 60/452,009, filed on Mar. 5, 2003.

(51) Int. Cl.
*B60J 3/02* (2006.01)

(52) U.S. Cl. .................................... 296/97.5; 296/97.8

(58) Field of Classification Search ............... 296/97.1, 296/97.5, 97.8, 37.7, 37.8; 224/312
See application file for complete search history.

(56) References Cited

U.S. PATENT DOCUMENTS

| | | | |
|---|---|---|---|
| RE33,631 E | * 7/1991 | Lobanoff et al. | 296/97.5 |
| 5,762,246 A | 6/1998 | Drew | |
| 6,024,400 A | * 2/2000 | Donoughe et al. | 296/97.5 |
| D432,490 S | * 10/2000 | Golenz | D12/417 |
| 2006/0103173 A1 | * 5/2006 | Schultz | 296/214 |
| 2006/0125277 A1 | * 6/2006 | Maharaj | 296/97.8 |

FOREIGN PATENT DOCUMENTS

| | | |
|---|---|---|
| DE | 10131044 A | 1/2003 |
| EP | 0943493 | 9/1999 |

* cited by examiner

*Primary Examiner*—Jason Morrow
(74) *Attorney, Agent, or Firm*—Honigman Miller Schwartz and Cohn LLP

(57) ABSTRACT

A passenger compartment visor assembly of a vehicle is disclosed. The visor assembly (10) includes a first member (16) and a second member (18). A support member (28) is positioned between the first member (16) and the second member (18). The first member (16) and the second member (18) are moveable relative to support member (28) between an open position and a closed position. The first member (16) and second member (18) each include an inner surface (20, 24) and an outer surface (22, 26). At least one of the inner surfaces (20, 24) includes at least one integrally-formed storage receptacle (30).

18 Claims, 4 Drawing Sheets

VISOR ASSEMBLY WITH INTEGRATED STORAGE RECEPTACLES

RELATED APPLICATIONS

This application is a National Stage Application of International Application No. PCT/US04/006678, filed on Mar. 4, 2004, and claims the benefit of U.S. Provisional Application No. 60/452,009, filed Mar. 5, 2003.

TECHNICAL FIELD

The present invention relates to an automotive visor assembly, and in particular to a visor assembly incorporating concealable storage receptacles.

BACKGROUND OF THE INVENTION

A visor assembly is traditionally positioned in the passenger compartment of an automobile at an upper corner of a headliner. Functionally, the visor assembly may be pivoted from a stowed position about the headliner to a lowered position about the windshield to shield a passenger's eyes from sun and glare. In addition to screening sun and glare from a passenger's eyes, it is known that conventional visor assemblies include additional accessories, such as mirrors, lights and the like. The additional accessories add cost and weight to the visor assembly, but also add conveniences that automobile passengers appreciate and pay for in luxury upgrades.

Additionally, it has become common practice for vehicle operators and passengers to use visor assemblies for the purpose of loosely storing items against the headliner such as, for example, papers, parking garage receipts, maps, and the like, when the visor assembly is positioned in the stowed position against the headliner. However, when the visor assembly is deployed downwardly against the windshield, the loosely-stowed items typically fall to the floor. To overcome this problem, conventional visor assemblies have been developed to include an elastic band, or the like, to positively secure items to the visor assembly such that when the visor assembly is deployed from the stowed position against the headliner to an in-use position against the windshield, the items are held in place about the visor assembly.

Recently, aftermarket 'add on' visor assembly accessories have been developed to function in the stowage of items about the visor assembly. Examples of an 'add on' visor assembly accessory directed to the stowage of compact discs are described in U.S. Published Patent Application No. 2003/0183667 and U.S. Design Pat. Nos. 432,490 and 453,728. Such aftermarket storage cases include a plurality of storage receptacles that promote open access, stowage, and protection of the compact discs when the visor is stowed against the headliner, or, alternatively, when the visor is deployed about the windshield.

Known aftermarket compact disc storage cases have a number of disadvantages. First, the storage cases are typically bulky and add weight to the visor assembly, and because most visor assemblies are not designed or manufactured with the intent to withstand such applied additional weight, some visor assemblies may not support the 'add-on' storage case with its contents, which results in the inadvertent deployment of the visor against the windshield. When deployed without notice against the windshield, the visor assembly may undesirably reduce an operator's visibility. Additionally, straps that are used to secure the storage case to the visor assembly may damage the outer surfaces of the visor. For example, the straps may wear the vinyl, leather, or cloth material covering the visor assembly, such that undesirable strap impressions or slits are left in the visor assembly material when the storage case is removed. Even further, the straps may not be positively secured, or, in another situation, be long enough to accommodate most visor assemblies, thereby creating a dangerous operating situation if the straps should fail. Failure of the straps would result in the storage case plummeting from the visor assembly and causing a distraction to the vehicle operator.

Thus, there remains a need to produce a visor assembly that provides storage for materials, such as compact discs, but does not damage the visor assembly, place a potentially damaging load on the visor assembly, or inadvertently reduce visibility of the operator, which may be caused when the visor assembly is inadvertently moved by gravity from a stowed position to a deployed position.

SUMMARY OF THE INVENTION

The inventors of the present invention have recognized these and other problems associated with conventional visor assemblies and 'add-on' storage accessories. To this end, the inventors have developed a visor assembly that provides integrated storage receptacles to protect compact discs.

Specifically, the invention is a visor assembly including a first member and a second member. A support member is positioned between the first member and the second member. The first member and the second member are moveable relative to support member between an open position and a closed position. The first member and second member each include an inner surface and an outer surface. At least one of the inner surfaces includes at least one integrally-formed storage receptacle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
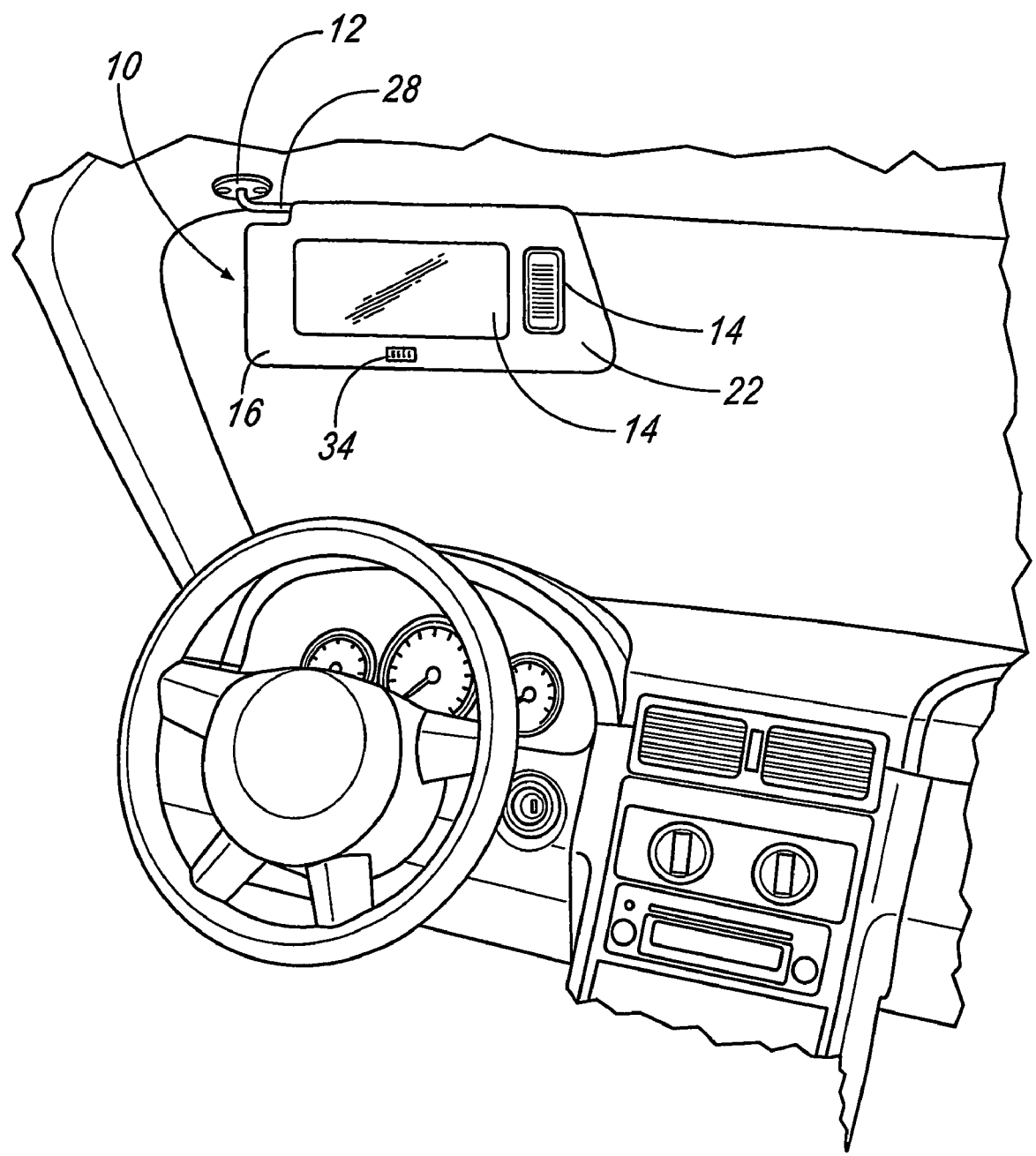
FIG. 1 is a perspective view of a visor assembly in a lowered and closed position in accordance with the invention.
Figure 2:
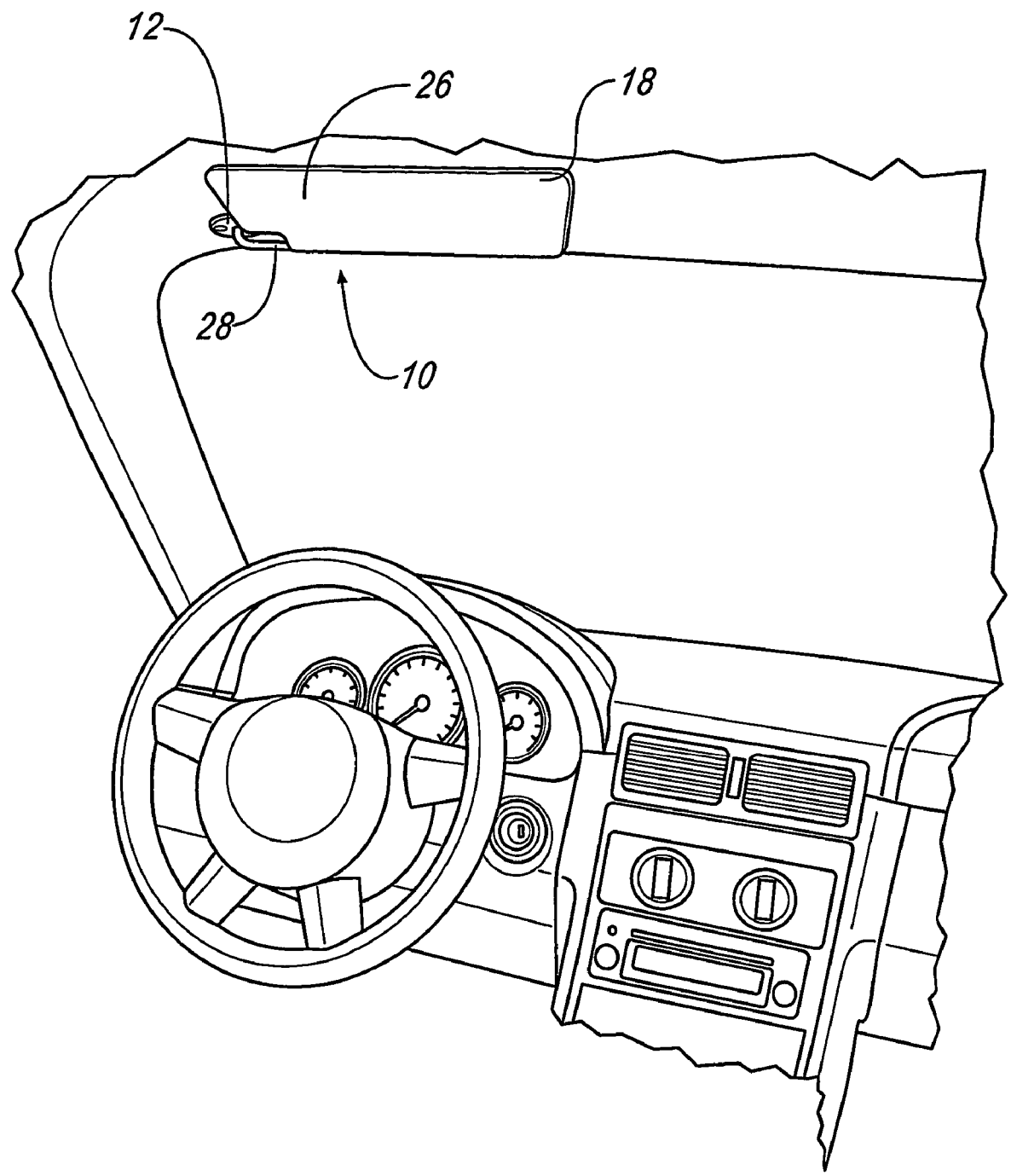
FIG. 2 is a perspective view of the visor assembly of the present invention in an upper and closed position.

Referring to FIGS. 1 and 2, a visor assembly is generally shown at 10. The visor assembly 10 is typically positioned within the passenger compartment of an automotive vehicle at an upper corner of a headliner. The visor assembly 10 is attached to the headliner by one or more hinge mechanism 12. The hinge mechanism 12 permits the visor assembly 10 to pivot between a stowed position substantially against the headliner (FIG. 2) to a deployed position substantially against the windshield (FIG. 1). In addition to providing the pivoting movement described above, the hinge mechanism 12 also promotes rotational movement against a driver-side window (not shown) and the windshield. As such, when the visor assembly 10 is lowered to the deployed position, sunlight and glare is shielded from the eyes of a passenger. Furthermore, when the visor assembly 10 is deployed to the lowered position, the passenger also has access to various additional components 14. The components 14 typically include vanity mirrors, lights, and the like.

Figure 3:
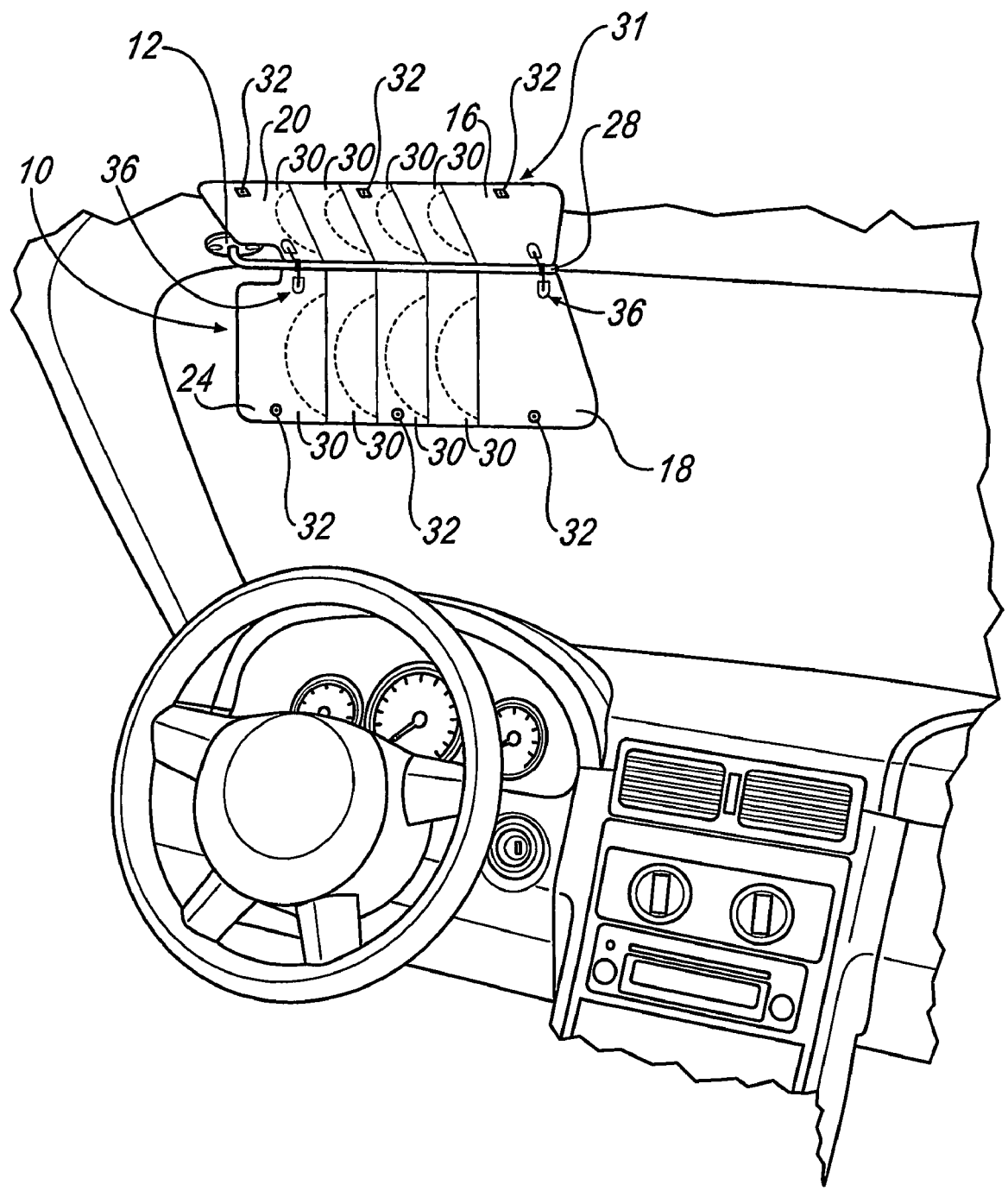
FIG. 3 is a perspective view of the visor assembly of the present invention in a lowered and open position.
Figure 4:
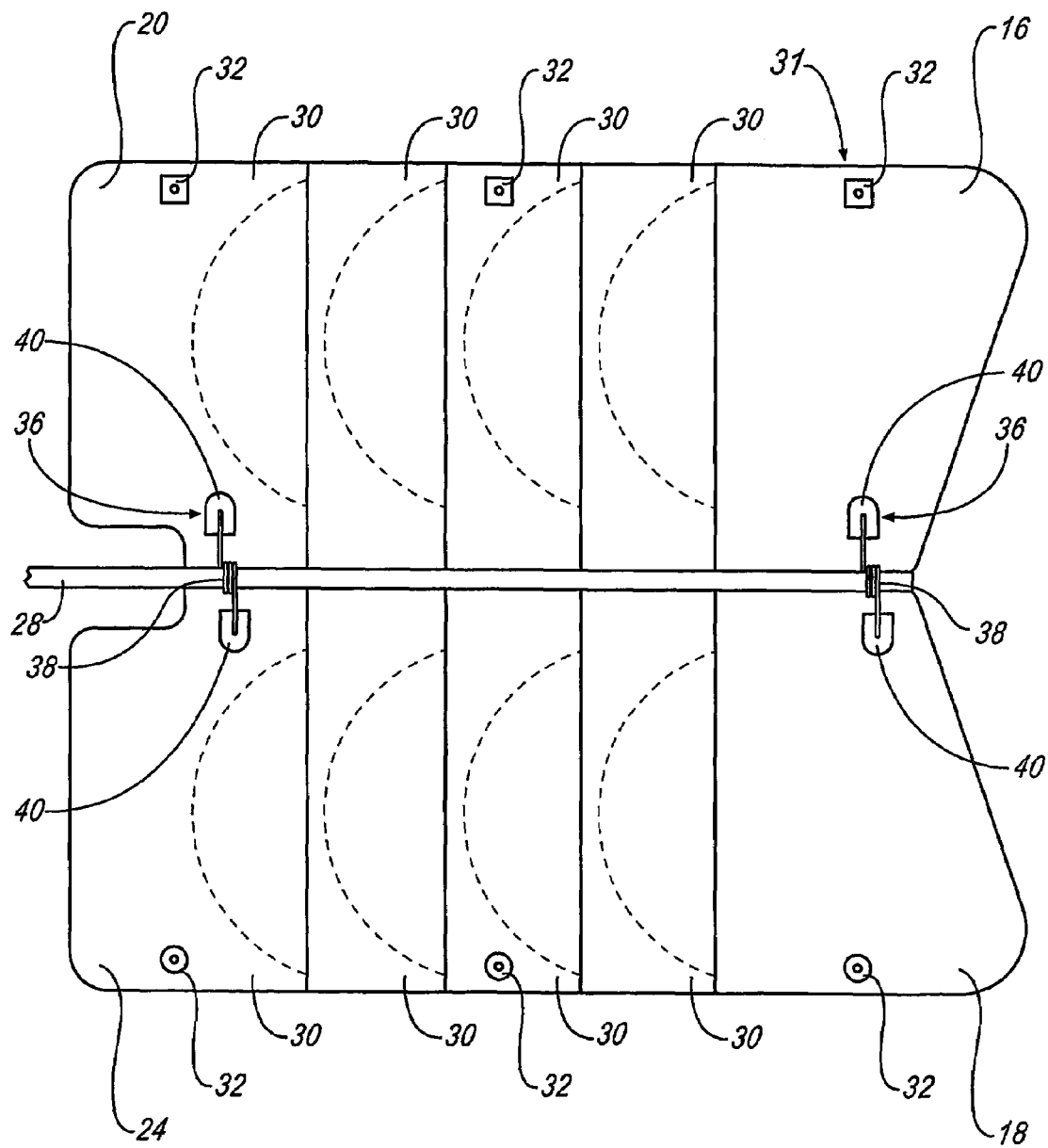
FIG. 4 is an enlarged view of the visor assembly of the present invention in the open position.

In accordance with the present invention, and as best seen in FIGS. 3 and 4, the visor assembly 10 includes a first member 16 and a second member 18. The first and second members 16, 18 are generally symmetrical but may be non-symmetrical. The first member 16 includes an inner surface 20 and an outer surface 22 and the second member 18 includes a inner surface 24 and a outer surface 26. The outer surfaces 22, 26 may be covered with any desirable material corresponding to the interior of the automobile, such as plastic, vinyl, leather, cloth, or the like. The inner surfaces 20, 24 may be lined with any desirable material, for example, a softer material, such as velvet, to maintain the integrity of and reduce scratching of an electronically readable surface of a compact disc, or the like. However, any other material that can reduce damage or wear of such electronically readable surfaces are also contemplated by this invention.

As seen more clearly in FIG. 4, a visor assembly support member 28, which is connected for pivotable movement in relation to the hinge mechanism 12, supports the first member 16 and the second member 18 of the visor assembly 10. The support member 28 may comprise a long, straight, metal rod or bar. However, the invention is not limited by the illustrated support member 28, and the invention can be practiced with any desirable support member.

In operation, the first and second members 16, 18 are deployable to and from open and closed positions about the support member 28 in a 'clam-shell-like' movement. When in the closed position, the inner surface 20 of the first member 16 directly opposes the inner surface 24 of the second member 18. Conversely, when deployed to the open position, the inner surfaces 20, 24 of the members 16, 18 are exposed to the operator. As seen in FIG. 3, when deployed to the open position, the first member 16 is substantially located against the headliner and the second member 18 is substantially located against the windshield glass.

The inner surfaces 20, 24 of the members 16, 18 include a plurality of integrally formed storage receptacles 30. As illustrated, the storage receptacles 30 comprise a plurality of slits formed in members 16, 18 that are capable of storing items, such as compact discs (shown in phantom). Because most compact discs are approximately 4.75 inches in diameter, each slit may comprise a length slightly greater than 4.75 inches. However, although FIGS. 3 and 4 illustrate storage receptacles 30 sized for compact discs, the storage receptacles 30 may comprise any length or shape to accommodate storage of various other items such as papers, maps, cassette tapes, mini-discs, and the like. As such, the integration of storage receptacles 30 in the visor assembly 10 for storing compact discs is only one embodiment contemplated by this invention. Furthermore, although FIGS. 3 and 4 show four storage receptacles 30 on both the first member 16 and the second member 18, any desirable number of storage receptacles 30 may be included in the design of the visor assembly 10.

According to one embodiment of the invention, deployment of the visor assembly 10 from the closed to open position may be permitted by firstly unlatching a latch mechanism, which is shown generally at 31. Functionally, the latch mechanism 31 secures the first member 16 and the second member 18 in the closed position. The latch mechanism 31 includes and is operatively connected to one or more latching members 32 spaced along an outer periphery of the inner surfaces 20, 24 of the first and second members 16, 18. When in the closed position, the latching members 32 mate together and secure the visor assembly 10 in the closed position.

To release the latch mechanism 31 and expose the inner surfaces 20, 24 in the open position, the operator may depress a button 34 (FIG. 1), which is operably coupled to the latching members 32. For convenience, the button 34 may be positioned on the outer surface 22 of the first member 18. The use of latching members 32 is one embodiment of securing the visor assembly 10 in a closed position, however, alternative embodiments are also contemplated and would be easily understood by one skilled in the art. Such alternative embodiments include the use of hook and loop fasteners, magnets, snaps, and the like.

As such, when latched in the closed position, items, such as compact discs, that are stored within the visor assembly 10, are positively secured in place. As a result, the compact discs are prevented from inadvertently being ejected from the visor assembly 10 when the operator may or may not be operating the vehicle. Additionally, when the visor assembly 10 remains in the closed position, with or without the use of the latch mechanism 31, the compact discs are completely hidden from sight, and a potential thief would not realize that compact discs were stored within the visor assembly 10 regardless if the visor assembly 10 was located in the stowed or deployed position as seen in FIGS. 1 and 2, respectively.

Referring to FIGS. 3 and 4, the visor assembly 10 may also include a dampening device, which is shown generally at 36. As illustrated, a pair of dampening devices 36 are located about the support member 28 at opposite ends of the visor assembly 10. Each dampening device 36 may include a dampening member comprising a spring 38 intermediately connecting two plates 40, which may comprise any desirable material, such as plastic, metal, or the like. If the plates 40 comprise metal, the plates 40 may be integrally cast with the spring 38.

As seen in FIG. 4, the spring 38 is positioned about the support member 28 and each plate 40 is respectively affixed to the first and second members 16, 18. In operation, the spring 38 dampens the movement of the first and second members 16, 18 between the closed and open positions. As such, the dampened movement provided by the dampening mechanism 36 prevents the visor assembly 10 from opening too fast and the possible ejection of items from the storage receptacles 30. The springs 38 are only intended to slow the opening movement of the visor assembly 10 and will not prevent deployment of the visor assembly 10 from the headliner to the windshield. Even further, by including the plates 40 in the design of the dampening device 36, an additional advantage of distributing the pressures associated with the spring 38 along the length of the visor assembly 10 is also achieved.

The present invention provides numerous advantages over conventional visor assemblies and obviates the use of aftermarket products to store items, such as compact discs. Because the slits or storage receptacles 30 are integrally formed with the members 16, 18, the need for 'add-on' aftermarket accessories including straps or other means for attaching the conventional 'add-on' accessories to the visor assembly 10 are thereby eliminated. As a result, the inventive visor assembly 10 may be properly designed to function as a storage receptacle for items, such as compact discs, while accommodating the weight of the stowed items loaded onto the visor assembly 10.

It should be understood that the aforementioned and other various alternatives to the embodiments of the invention described herein may be employed in practicing the invention. The scope of the invention is not limited to visors, interior trim or automotive applications. It is intended that the following claims define the scope of the invention and that the method and apparatus within the scope of these claims and their equivalents be covered thereby.

What is claimed is:

1. A visor assembly comprising:
   a first member
   a second member, wherein at least one of said first member and said second member includes at least one storage receptacle;
   a support member positioned between said first member and said second member such tat said first and second members are movable relative to said support member between an open and a closed position; and
   a dampening device including a coil spring wrapped around the support member and operatively connected to said first and second members for at least dampening said movement of said first and second members when moved to one of or both of said open or closed position.

2. The visor assembly according to claim 1, wherein said dampening device is further adapted for stabilizing said first and second members when said visor assembly is in said open position such tat said second member remains in a relatively immobile position until said visor assembly is moved to said closed position.

3. The visor assembly according to claim 1, wherein the first member and second member each include an inner surface and an outer surface, and further wherein said at least one storage receptacle is provided within at least one of said inner surfaces.

4. The visor assembly according to claim 3, wherein, when said visor assembly is in the closed position,
   the inner surface of the first member directly opposes the inner surface of the second member such that the at least one integrally-formed storage receptacle is concealed from sight.

5. The visor assembly according to claim 3, wherein, when said visor assembly is in the open position,
   the outer surface of the first member is positioned substantially adjacent to a headliner of a vehicle, and
   the outer surface of the second member is positioned substantially adjacent to a windshield of the vehicle, such that the at least one integrally-formed storage receptacle is viewable and accessible.

6. The visor assembly according to claim 1, further including a latch mechanism for securing the first member and said second member when said visor assembly is in the closed position.

7. The visor assembly according to claim 6, wherein the latch mechanism includes one or more latching members spaced along an outer periphery of the inner surface.

8. The visor assembly according to claim 7, wherein the latching member include hook and loop fasteners, magnets, or snaps.

9. The visor assembly according to claim 1, wherein the support member comprises a metal rod.

10. The visor assembly according to claim 1, comprising a pair of devices connected to said first and second members at opposite ends thereof.

11. The visor assembly according to claim 1, wherein said coil spring has two ends, each of said ends further including a connecting plate, one of said connecting plates connected to said first member, the other one of said connecting plates connected to said second member.

12. The visor assembly according to claim 3, wherein the at least one storage receptacle is defined by said at least one inner surface.

13. The visor assembly according to claim 12, wherein the inner surfaces are lined with a soft material that maintains the integrity of and resists scratching of an electronically readable surface of a compact disc.

14. The visor assembly according to claim 1, wherein the outer surfaces include a plastic, vinyl, leather, or cloth material.

15. The visor assembly according to claim 1, wherein the first member and second member are symmetric.

16. The visor assembly according to claim 12, wherein the at least one storage receptacle is a silt.

17. The visor assembly according to claim 16, wherein the slit includes a length slightly greater than approximately 4.25 inches to accommodate the storing of a compact disc within the at least one storage receptacle.

18. The visor assembly according to claim 1, wherein said dampening device dampens movement of said first and second members when moved to and from said open or closed position.

* * * * *

UNITED STATES PATENT AND TRADEMARK OFFICE
CERTIFICATE OF CORRECTION

PATENT NO. : 7,240,951 B2  Page 1 of 1
APPLICATION NO. : 10/547853
DATED : July 10, 2007
INVENTOR(S) : Joshua Willerton It is certified that error appears in the above-identified patent and that said Letters Patent is hereby corrected as shown below:

In Column 5, Line 16, "tat" should be changed to --that--.

In Column 5, Line 27, "tat" should be changed to --that--.

In Column 6, Line 36, "silt" should be changed to --slit--.

In Column 6, Line 39, "4.25 inches" should be changed to --4.75 inches--.

Signed and Sealed this

Twenty-third Day of October, 2007

JON W. DUDAS
*Director of the United States Patent and Trademark Office*